United States Patent
Tokunaga

(10) Patent No.: US 8,797,412 B2
(45) Date of Patent: Aug. 5, 2014

(54) IMAGE CAPTURING APPARATUS

(75) Inventor: Koshi Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 13/363,243

(22) Filed: Jan. 31, 2012

(65) Prior Publication Data

US 2012/0200718 A1 Aug. 9, 2012

(30) Foreign Application Priority Data

Feb. 4, 2011 (JP) .................................. 2011-022861

(51) Int. Cl.
*H04N 5/225* (2006.01)
*H04N 5/76* (2006.01)

(52) U.S. Cl.
USPC ................ 348/207.1; 348/220.1; 348/231.99; 348/231.7; 348/231.9

(58) Field of Classification Search
USPC ........................................... 348/207.1, 220.1
See application file for complete search history.

(56) References Cited

U.S. PATENT DOCUMENTS 7,310,112 B1 * 12/2007 Watanabe ................... 348/207.1
8,010,146 B2 * 8/2011 Shichino ....................... 455/522
2003/0043272 A1 * 3/2003 Nagao et al. ............... 348/207.1
2005/0146621 A1 * 7/2005 Tanaka et al. .............. 348/211.2
2008/0129827 A1 * 6/2008 Morino ...................... 348/207.1
2009/0302110 A1 * 12/2009 Tsujii ............................ 235/441
2010/0240322 A1 * 9/2010 Ando .............................. 455/73

FOREIGN PATENT DOCUMENTS

| CN | 1495503 A | 5/2004 |
| CN | 1692631 A | 11/2005 |
| JP | 2001-111883 A | 4/2001 |

\* cited by examiner

*Primary Examiner* — Roberto Velez
*Assistant Examiner* — Quan Pham
(74) *Attorney, Agent, or Firm* — Canon U.S.A., Inc., IP Division

(57) ABSTRACT

An image capturing apparatus capable of controlling a communication device configured to transmit image data to an external apparatus, wherein in a case where a first shooting mode is set, the image capturing apparatus performs control to invalidate a communication function of the communication device in response to accepting a shooting preparation instruction or a shooting instruction, and, in a case where a second shooting mode is set, the image capturing apparatus performs control to invalidate the communication function of the communication device in response to shifting to the second shooting mode.

15 Claims, 11 Drawing Sheets

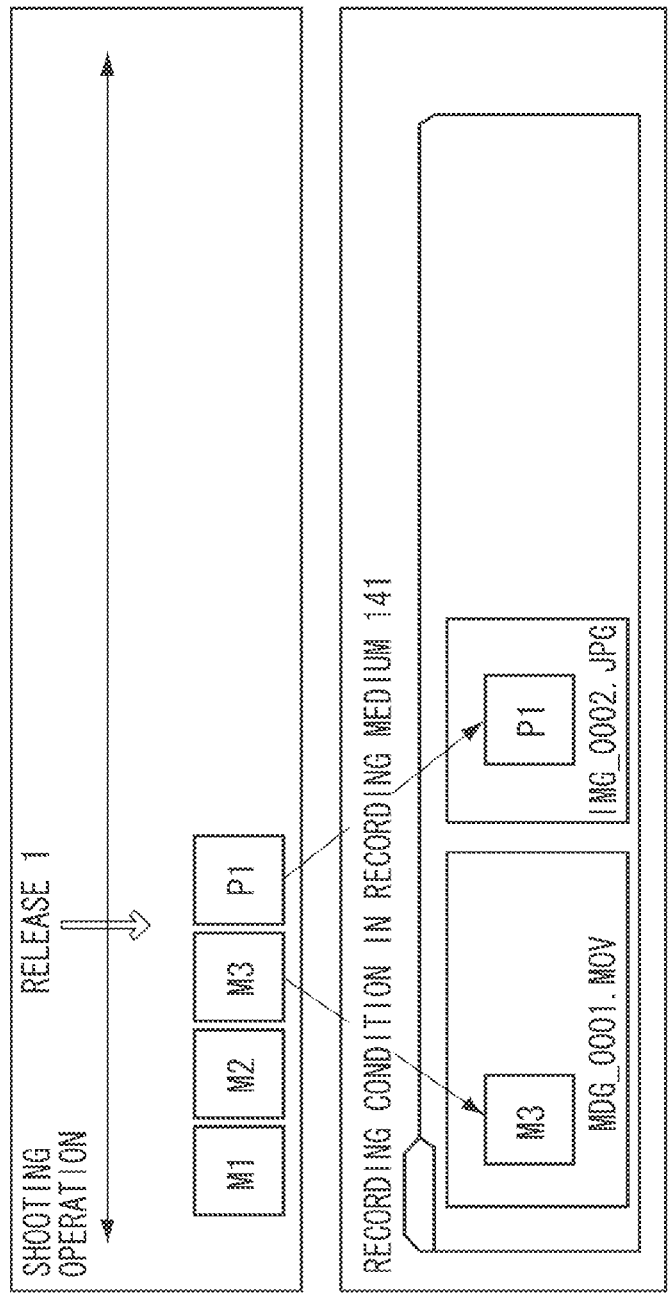

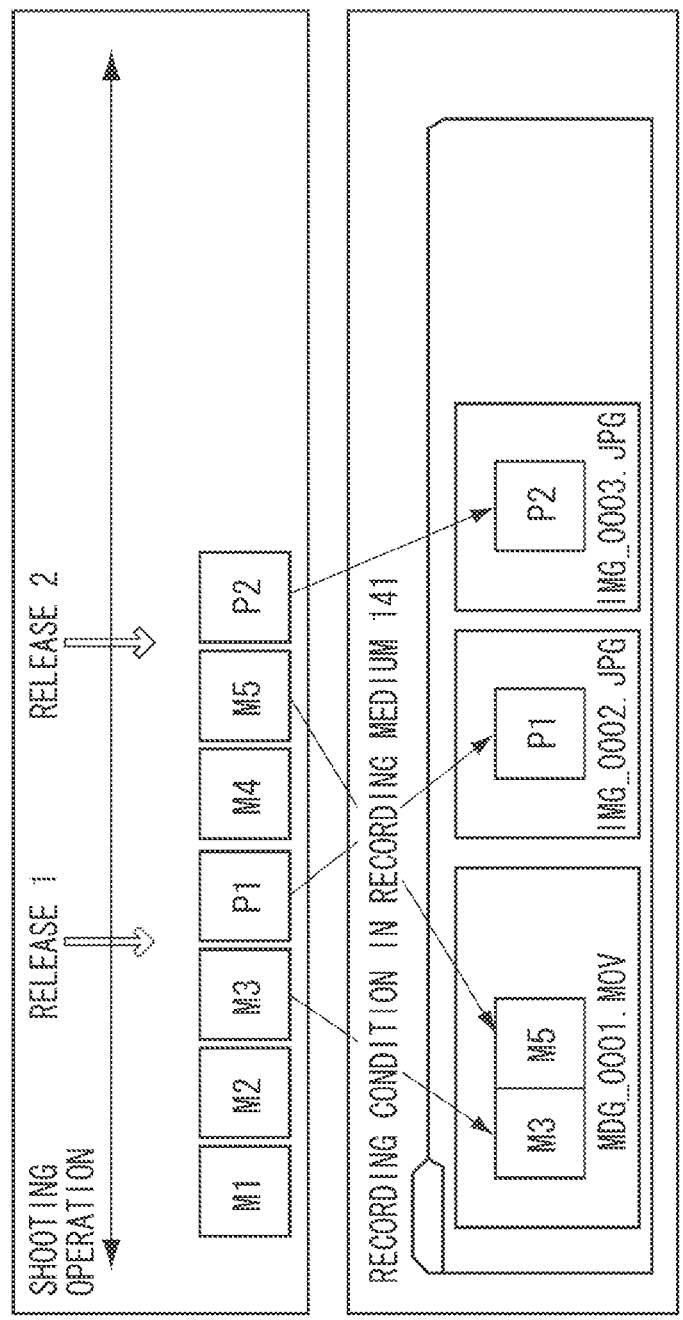

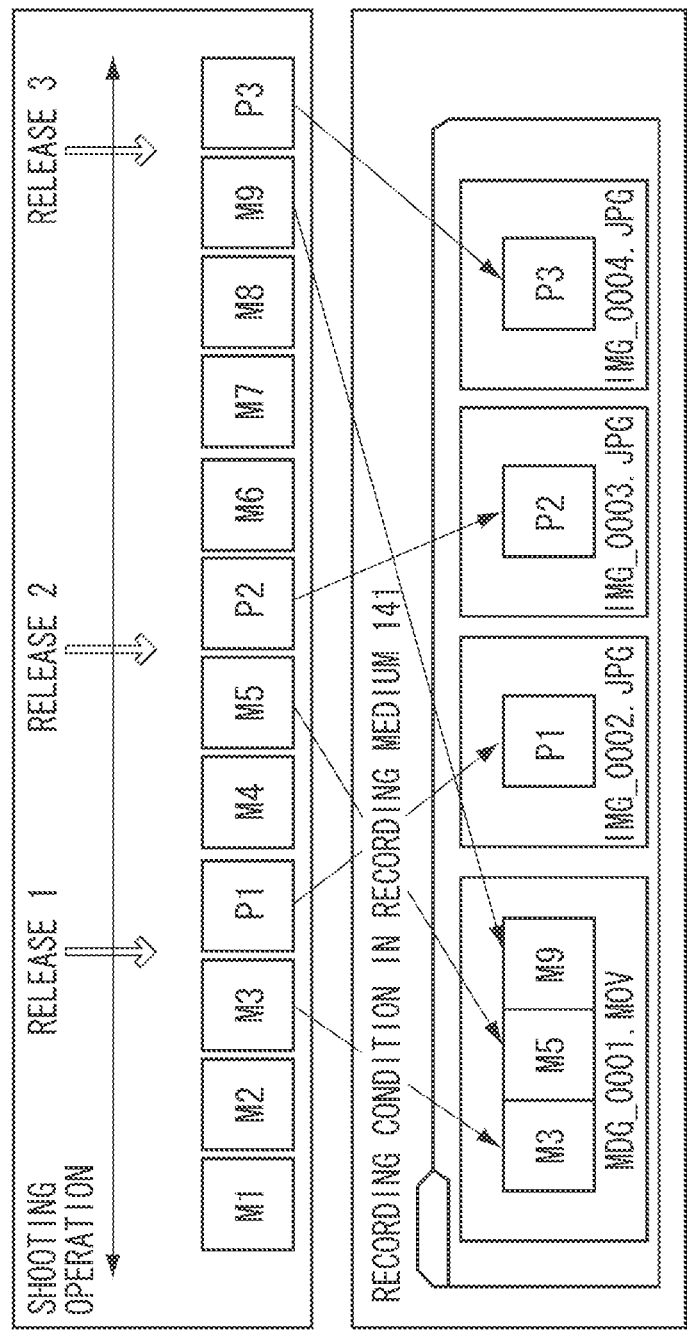

IMAGE CAPTURING APPARATUS

BACKGROUND OF THE INVENTION

1. Field of the Invention

The present invention relates to an image capturing apparatus capable of controlling transmission of a file.

2. Description of the Related Art

Recently, digital cameras accommodating wireless communication function and a recording medium loaded with the wireless communication function have been available. Using these devices, an image file captured by a digital camera can be transmitted immediately to a personal computer (PC).

However, when a user transmits a picture taken by him wirelessly at the same time when the picture is taken, there is a possibility that communication noise may affect the transmitted image. Thus, as discussed in Japanese Patent Application Laid-Open No. 2001-111883, an electronic camera which stops generation of carriers of radio wave in a period after an image or sound is captured until it is recorded is known. In the electronic camera discussed in Japanese Patent Application Laid-Open No. 2001-111883, wireless transmission of the data is stopped when a release switch is pressed. However, generally, the image capturing apparatus contains a variety of shooting modes and recording modes, and depending on a mode, it is not always appropriate to stop the wireless transmission when the release switch is pressed.

SUMMARY OF THE INVENTION

The present invention is directed to an image capturing apparatus capable of controlling a communication device configured to transmit image data to an external apparatus, the image capturing apparatus includes a shooting mode setting unit configured to set a shooting mode, wherein the shooting mode includes a first shooting mode and a second shooting mode, an image capturing unit configured to shoot an object based on the shooting mode to obtain image data, a recording unit configured to record the image data obtained by the image capturing unit in a recording medium, an operation unit configured to accept a shooting preparation instruction or a shooting instruction from a user, and a control unit configured to control the communication function of the communication device, wherein, the image capturing unit starts shooting of an image in response to an operation of the operation unit in the first shooting mode, wherein, the image capturing unit starts shooting of an image without accepting the shooting preparation instruction or the shooting instruction through the operation unit in the second shooting mode, wherein, in a case that the first shooting mode is set by the shooting mode setting unit, the control unit performs control to invalidate the communication function of the communication device in response to accepting the shooting preparation instruction or the shooting instruction through the operation unit, and wherein, in a case that the second shooting mode is set by the shooting mode setting unit, the control unit performs control to invalidate the communication function of the communication device in response to shifting to the second shooting mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A, 6B and 6C are diagrams illustrating an operation of the digital camera in a movie digest mode.

DESCRIPTION OF THE EMBODIMENTS

Various exemplary embodiments, features, and aspects of the invention will be described in detail below with reference to the drawings. The present invention is not restricted to following exemplary embodiments. A variety of exemplary embodiments may be appropriately combined with each other.

Hereinafter, as an example of an image capturing apparatus, a digital camera capable of capturing a still image or a moving image will be described. A portable phone with camera function is also an example of the image capturing apparatus mentioned here.

Figure 1:
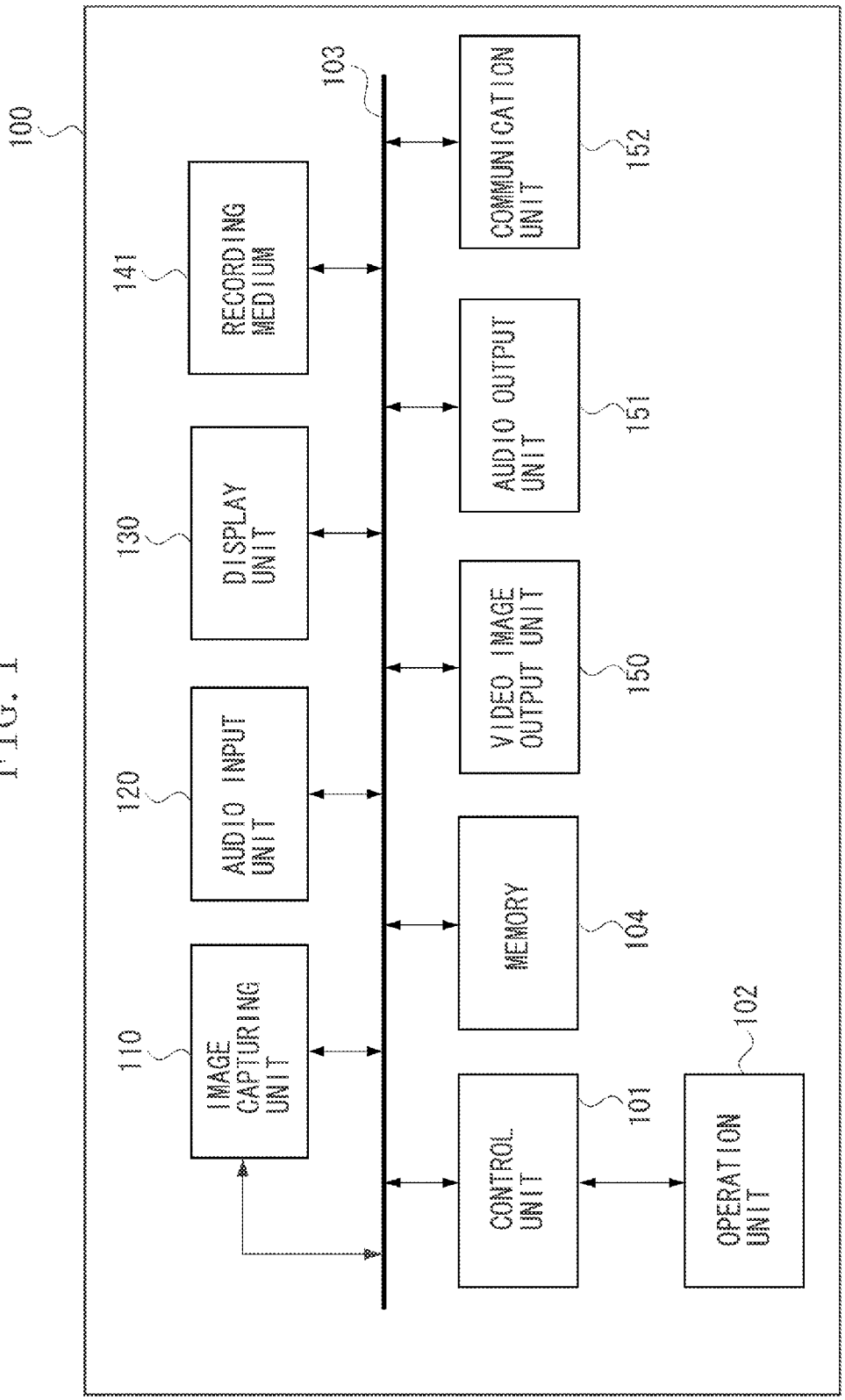
FIG. 1 is a block diagram illustrating the configuration of a digital camera.

FIG. 1 is a block diagram illustrating the configuration of a digital camera 100 according to the present exemplary embodiment.

A control unit 101 is constituted of, for example, a CPU (MPU), a memory such as DRAM, SRAM and the like to execute a variety of processing (programs) for controlling each unit of the digital camera 100 and controlling data transmission between each unit. The control unit 101 controls each unit of the digital camera 100 in response to an operation signal from an operation unit 102 which accepts a user's operation.

The operation unit 102 includes a variety of switches for inputting various operations concerning shooting of images such as a power button, a zoom adjustment button, auto-focus button. The operation unit 102 may be configured of a menu display button, a determination button, other cursor keys, a pointing device, a touch panel and the like. When a user operates any one of these keys or buttons, the operation unit 102 transmits an operation signal to the control unit 101. The operation unit 102 has a release button, which functions as a switch SW 1 when the release switch is half pressed and functions as a switch SW2 when the release switch is fully pressed. When the release switch SW1 is pressed, an instruction for preparation for shooting of an image is output. When the release switch SW2 is pressed, an instruction for shooting is output. While, according to the present exemplary embodiment, the same release button is used in common for capturing a still image and a moving image, it is possible to provide different buttons for each purpose.

A general bus 103 is provided to transmit a variety of data, control signals and instruction signals to each unit of the digital camera 100.

An image capturing unit 110 converts an optical image of an object captured by a lens to an image signal through such an image capture device as a CCD sensor, CMOS sensor by controlling the amount of light with a diaphragm.

A sound input unit 120 collects sounds around the digital camera 100 through a built-in nondirectional microphone or an external microphone connected via an audio input terminal.

A memory 104 is a RAM or a flush memory configured to record an image signal and an audio signal temporarily.

A recording medium 141 is connectable to the digital camera. The recording medium 141 can record a variety of data generated by the digital camera 100. As the recording medium 141, for example, a hard disk, an optical disk, and a flush memory are available. In the exemplary embodiment, the flush memory mountable on the digital camera 100 which is generally called memory card will be described.

An audio output unit 151 is constituted of, for example, an audio output terminal, and transmits an audio signal to output a voice and sound from a connected earphone or a speaker. The audio output unit 151 may be accommodated in the digital camera 100.

A video image output unit 150 is constituted of, for example, a video image output terminal and transmits an image signal to display the image on a connected external display. The audio output unit 151 and the video image output unit 150 may be an integrated terminal such as high-definition multimedia interface (HMDI) terminal.

A communication unit 152 performs serial- or parallel-data communication with an external device by wire or radio, for example, through RS232C, USB, IEEE1394, P1284, SCSI, modem, LAN and wireless communication.

A display unit 130 displays image data and graphic user interface (GUI) such as a variety of menus, recorded in the recording medium 141. As the display unit 130, a liquid crystal display, organic electroluminescence display and the like are available.

A shooting mode of the digital camera 100 of the exemplary embodiment will be described.

As an operation mode, the digital camera 100 of the exemplary embodiment has still image mode, normal moving image mode, and movie digest mode. These shooting modes can be set through the operation unit 102 or through a menu operation. Now, these shooting modes will be described. Naturally, it is possible to provide other shooting modes for the digital camera 100 than the aforementioned three modes.

First, the still image shooting mode will be described. The still image shooting mode is used for capturing an image of an object in response to pressing of the release button SW2. More specifically, the control unit 101 shoots a still image to obtain still image data when it detects that the release button SW2 is pressed. Then, the obtained still image data is recorded in the recording medium 141 as an image file. This is a basic operation in the still image shooting mode.

Next, the normal moving image mode will be described. In the normal moving image mode, the control unit 101 starts shooting a moving image when detecting that the release button SW2 is pressed. In a period when no operation is done, the digital camera 100 continues the shooting of moving images and terminates the shooting when it detects again that the release button SW2 has been pressed. When terminating the shooting of the moving image, the control unit 101 records the obtained moving image data in the recording medium 141 as an image file. This is a basic operation in the normal moving image mode.

Next, the moving digest mode will be described.

A characteristic of the movie digest mode compared to other shooting modes is that this mode starts shooting of a moving image before the release button is pressed and records moving image data in the recording medium 141 as a moving image file.

When the digital camera 100 is changed to the movie digest mode, the control unit 101 starts shooting the moving image without waiting for the release button to be pressed. A captured moving image is recorded in the memory 104 in a predetermined period (4 seconds in the exemplary embodiment). An operation of this movie digest mode will be described with reference to FIGS. 6A to 6C. In response to change of the shooting mode to the movie digest mode, shooting of the moving image is started and a moving image data M1 is recorded 4 seconds long in the memory 104. When the shooting of the moving image is continued and generation of next moving image data M2 is started, the data M1 already stored in the memory 104 is discarded and instead of the M1, the M2 is recorded in the memory 104. When the M2 is captured in 4 seconds, the M2 is discarded and next moving data M3 is recorded.

Consider a case (release 1) where the release button is pressed when the M3 is being recorded into the memory 104. In this case, the digital camera 100 captures a still image P1 and records the image P1 in the recording medium 141 as a new still image file. Further, the newest moving image data M3 recorded in the memory 104 at that time is recorded in the recording medium 141 as a digest moving image file. In other words, when the release button is pressed, the still image file corresponding to the P1 and the moving image file corresponding to the M3 are recorded. FIG. 6A illustrates a condition at this time. If the release button is pressed before the M1 is captured 4 seconds long, the M1 corresponding to a currently captured amount (e.g., 2 seconds) is recorded in the recording medium 141 as a digest moving image file.

When shooting of the still image P1 terminates, the digital camera 100 resumes capturing of the moving image, so that moving image data M4, M5 are recorded in the memory 104.

When the release button is pressed (release 2) when the M5 is being recorded in the memory 104, the digital camera 100 captures the still image P2 and records the data P2 in the recording medium 141 as a new still image file. Further, the digital camera 100 adds the newest moving image data M5 recorded in the memory 104 at that time to the digest moving image file already generated. In other words, the digest moving image file at this time is a single moving image file in which the M3 and the M5 are joined together. FIG. 6B illustrates a condition at this time.

When shooting of the still image P2 terminates, the digital camera 100 resumes capturing of the moving image, so that moving images M6, M7, M8, M9 are recorded in the memory 104.

When the release button is pressed when the M9 is being recorded (release 3), the digital camera 100 captures the still image P3 and records the data in the recording medium 141 as a still image file. Further, the digital camera 100 adds the newest moving image data M9 recorded in the memory 104 at that time to the digest moving image file already generated. More specifically, the digest moving image file at this time is a single moving image file in which the M3, the M5 and M9 are joined together. FIG. 6C illustrates a condition at this time.

The digest moving image file as generated above will be described. The digest moving image file in which the M3, M5 and M9 are joined together is generated by joining moving image data captured around the time when the still images P1, P2, P3 are captured. Generally, time that a photographer shoots a still image is often a critical moment for the photographer. More specifically, there is a high possibility that the moving image data M3, M5, M9 several seconds just before the still image is shot, may be highly valuable images which may record scenes until such a critical moment is reached. In the movie digest mode of the exemplary embodiment, the digest moving image data is generated by joining together these moving image data. When playing back this digest moving image data, the M3, M5, and M9 are reproduced consecutively. Such reproduced images may show a digest of the critical scenes in some events. In other words, by only switching the shooting mode to the movie digest mode and pressing the release button to capture still images, the photographer can automatically obtain a digest moving image file. This is the movie digest mode.

Figure 2:
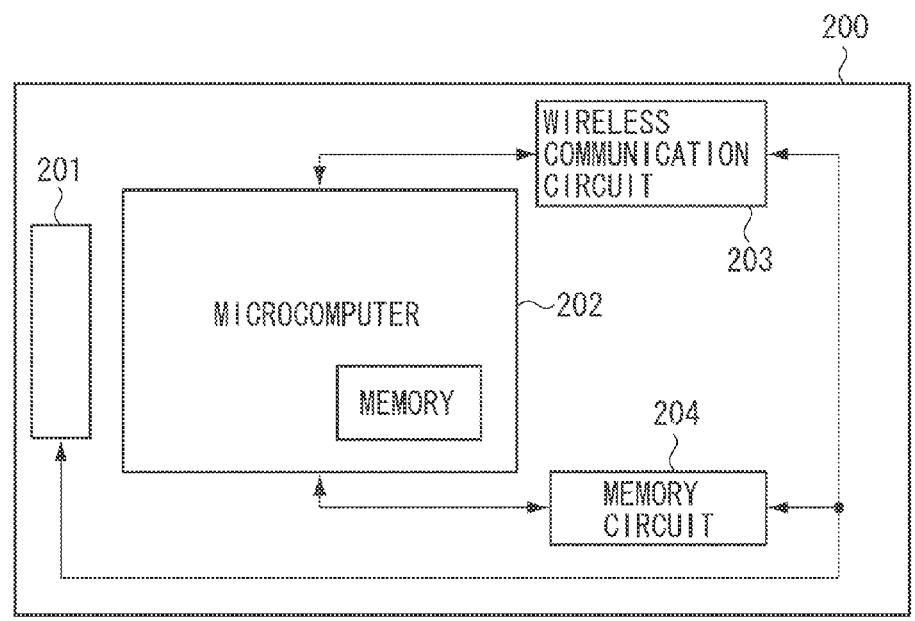
FIG. 2 is a block diagram illustrating the configuration of a wireless recording medium.

Next, the recording medium possessing wireless communication function as an example of a communication device will be described. The digital camera 100 of the exemplary embodiment becomes capable of transmitting a captured image data to other places by mounting a recording medium having wireless communication function (hereinafter referred to as wireless communication recording medium) as the recording medium 141. Hereinafter, the configuration of the wireless communication recording medium will be described with reference to FIG. 2.

A wireless communication recording medium 200 includes a connector 201, a microcomputer 202, and a memory circuit unit 204.

The connector 201 is an interface which connects the wireless communication recording medium 200 to the digital camera 100 or other information processing apparatus to make them exchange data. The wireless communication recording medium 200 is connected to the digital camera 100 physically and electrically via this connector 201.

When the wireless communication recording medium 200 is mounted on the digital camera 100, the wireless communication recording medium 200 is supplied with electricity from the digital camera 100 via a power line to communicate with the digital camera 100. The wireless communication circuit unit 203 has a function for transmitting and receiving data to/from other apparatus by radio. According to the exemplary embodiment, the wireless communication circuit unit 203 communicates wirelessly via wireless local area network (LAN). The type of the wireless communication is not restricted to the wireless LAN, but it is possible to use Bluetooth (registered trademark), infrared communication or proximity wireless communication.

The memory circuit unit 204 is constituted of a rewritable nonvolatile memory device, for example, EEPROM or flush type EPROM, and records data supplied from an electronic device connected via the connector 201. Because the memory circuit unit 204 of the exemplary embodiment has a recording capacity of several Giga level, the wireless communication recording medium 200 may be used as a memory card.

The microcomputer 202 accommodates a memory, and according to a control procedure stored preliminarily in this memory, controls the wireless communication circuit unit 203, the memory circuit unit 204, and communication with an electronic device such as the digital camera 100 connected via the connector 201.

An image transmission according to the exemplary embodiment is achieved when the wireless recording medium 200 mounted as the recording medium 141 on the digital camera 100 communicates with a personal computer (PC) as an external apparatus which is a transmission target. In this case, the wireless communication recording medium 200 does not have to communicate directly with the PC but may communicate via a wireless communication access point.

A basic operation of the wireless communication recording medium 200 will be described here. When the digital camera 100 executes shooting processing, an image file is recorded in the memory circuit unit 204 in the wireless communication recording medium 200 mounted on the digital camera 100 as a recording medium 141.

When the microcomputer 202 in the wireless communication recording medium 200 detects that a transmittable image file is stored in the memory circuit unit 204, it establishes a communication with a communication target (PC or access point) previously registered in the memory circuit unit 204. Then, when the communication is established, the microcomputer 202 transmits an image file to the PC. Whether a file can be transmitted is determined by the microcomputer 202 referring to the type of a recorded image file.

Owing to the above-described operation of the wireless communication recording medium 200, when the digital camera 100 mounted on the wireless communication recording medium executes a shooting operation, a captured image file is automatically transmitted to the PC by the wireless communication recording medium 200.

To prevent a user from executing an unexpected automatic transmission by mistake, the digital camera 100 of the exemplary embodiment can set the wireless communication function of the wireless communication recording medium to be valid or invalid as a communication setting. More specifically, the control unit 101 instructs the wireless communication recording medium 200 to set the wireless communication function to be valid or invalid. When the microcomputer 202 accepts an instruction for invalidating the wireless communication function, the microcomputer 202 stops the operation of the wireless communication circuit unit 203. To stop the operation of the wireless communication circuit unit 203, a supply of electricity to the wireless communication circuit unit 203 may be stopped or control is performed not to transmit radio wave while supplying electricity to the wireless communication circuit unit 203 maintained. Such a communication setting is held by the memory circuit unit 204. In the meantime, this communication setting can be made by the user through the menu, or when a predetermined condition is satisfied, can be automatically changed by the control unit 101.

Figure 3:
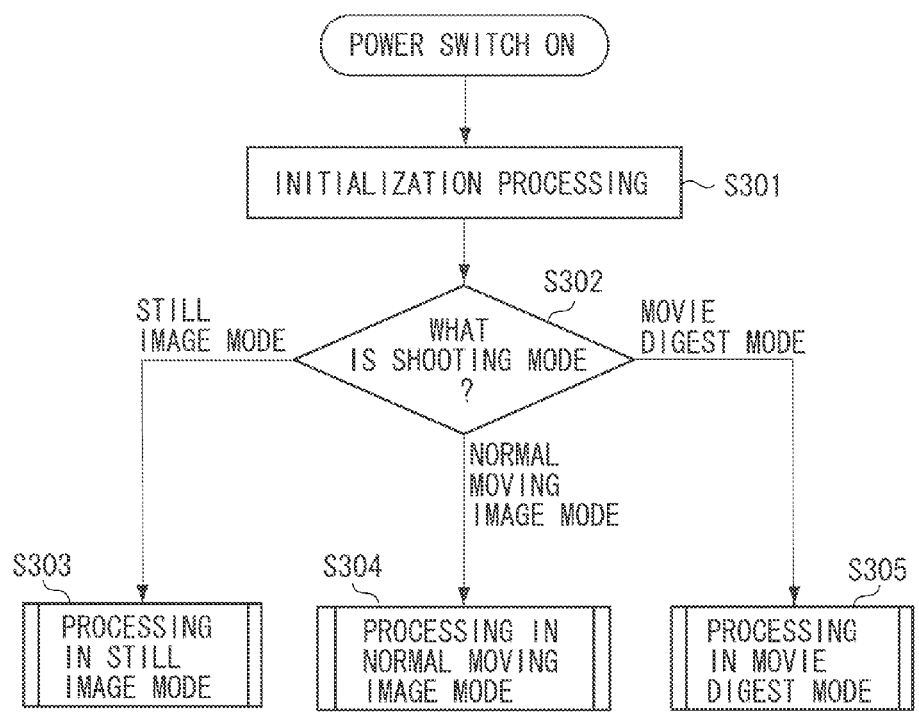
FIG. 3 is a flow chart illustrating processing procedure of the digital camera.

FIG. 3 is a flow chart illustrating a basic operation of the digital camera 100. This flow chart is started when the control unit 101 detects that a power button in the operation unit 102 is pressed. Processing indicated by this flow chart is achieved when the control unit 101 controls each unit of the digital camera 100 according to an input signal from each unit or a program. Processing indicated by other flow charts is achieved in the same manner unless otherwise mentioned.

In step S301, the control unit 101 executes an initialization processing for the digital camera 100. In the initialization processing, whether the recording medium 141 is mounted is confirmed, and a lens barrel is driven to prepare for shooting.

In step S302, the control unit 101 determines a current shooting mode. The digital camera 100 of the exemplary embodiment holds a shooting mode set when the power is turned off last time and applies this mode as an initial mode when the power is turned on. When it is determined that the initial mode is a still image mode, the processing proceeds to step S303, and when it is determined that the initial mode is a normal moving image mode, the processing proceeds to step S303, and when it is determined that the initial mode is movie digest mode, the processing proceeds to step S304. In steps S303 to S305, processing corresponding to each shooting mode is carried out. A shooting mode shifting operation by the operation unit 102 is in principle recognized as interruption processing. Thus, when the shooting mode shifting operation is detected during any operation at each shooting mode, the control unit 101 executes processing of step S302 as interruption processing. Hereinafter, the processing at each shooting mode will be described.

Figure 4A:
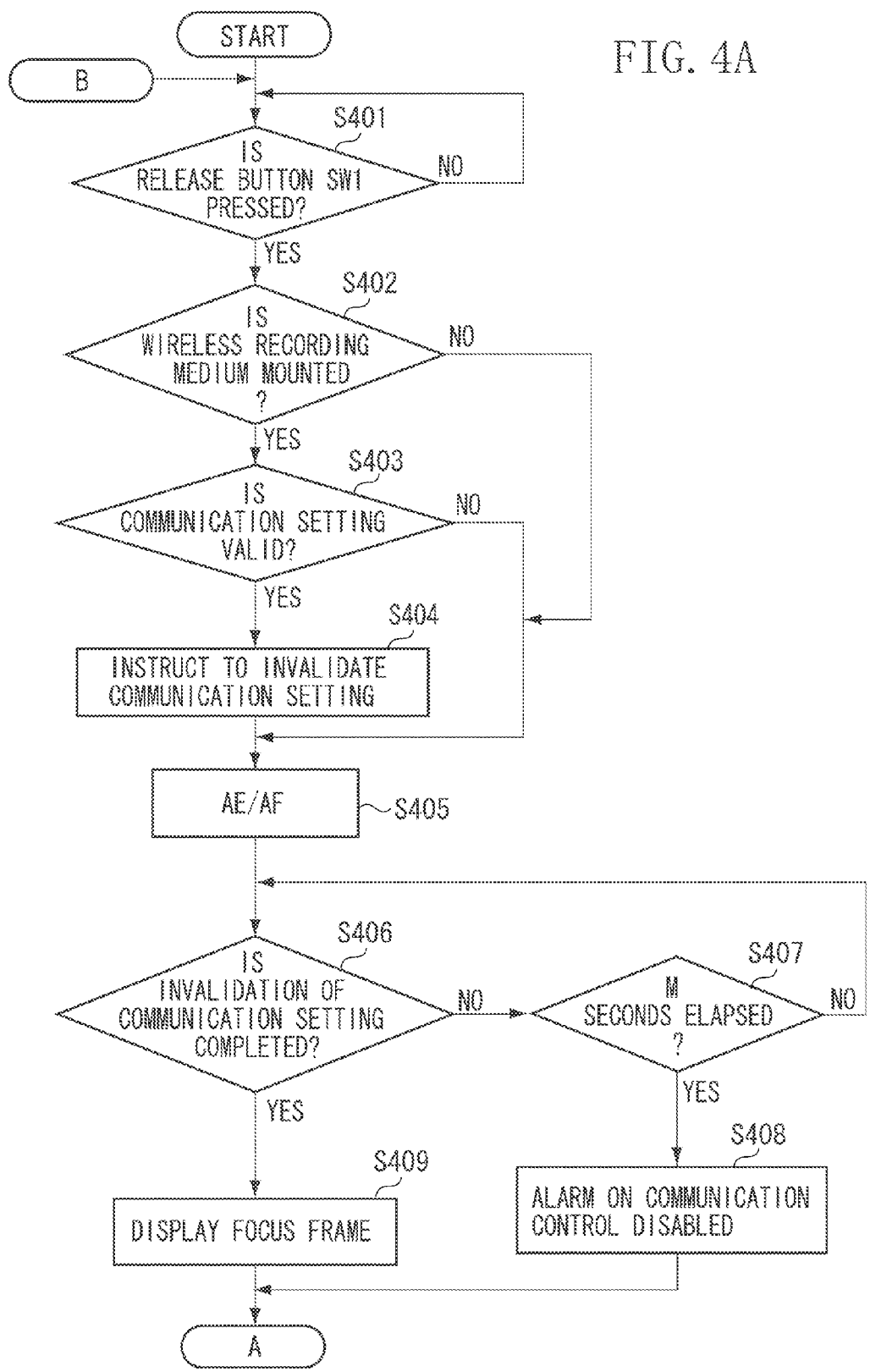
FIG. 4A is a flow chart illustrating processing procedure of the digital camera.
Figure 4B:
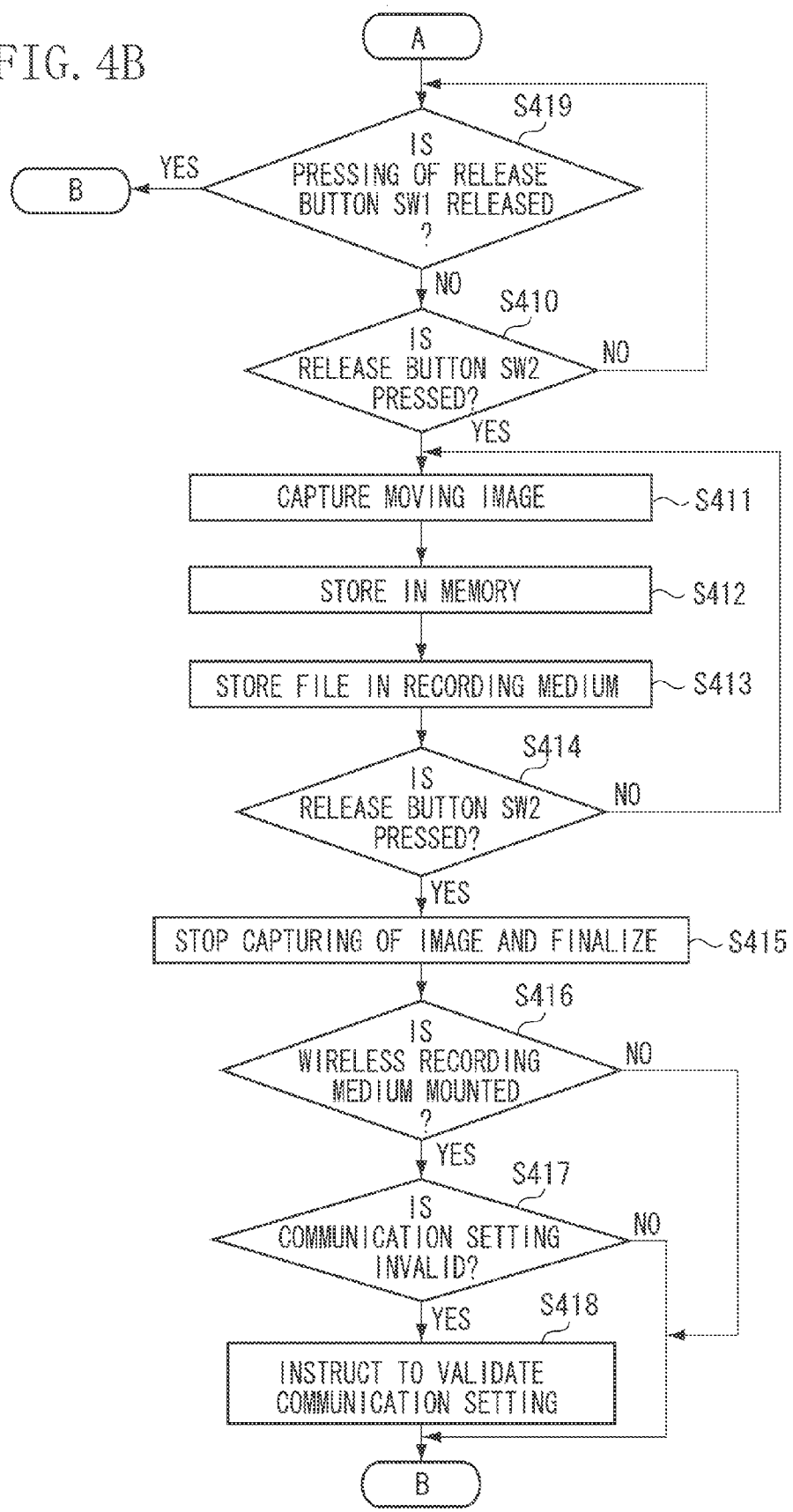
FIG. 4B is a flow chart illustrating the processing procedure of the digital camera.

As an example of the shooting mode, processing at normal moving image mode will be described with reference to FIGS. 4A and 4B.

In step S401, the control unit 101 determines whether the release button SW1 of the operation unit 102 has been pressed. If the control unit 101 determines that the release button SW1 of the operation unit 102 has been pressed by a user, the processing proceeds to step S402. Otherwise, the control unit 101 stands by until the release button SW1 is pressed.

In step S403, the control unit 101 determines whether the wireless communication recording medium 200 is mounted on the digital camera 100. When it is determined that the wireless communication recording medium 200 is mounted, the processing proceeds to step S403. If it is determined that no wireless communication recording medium 200 is mounted, the processing proceeds to step S405. Whether any wireless communication recording medium is mounted can be determined by the control unit 1001 which refers to medium information in the wireless communication recording medium 200.

In step S403, the control unit 101 verifies a current communication setting in the wireless communication recording medium 200 and determines whether the communication setting is valid. More specifically, the control unit 101 transmits an inquiry to the wireless communication recording medium 200, and the microcomputer 202 sends back a reply to the digital camera 100 according to a content of the inquiry. By referring to this reply, the control unit 101 verifies the communication setting. If it is determined that the communication setting is valid, the processing proceeds to step S404. If it is determined that the communication setting is invalid, the processing proceeds to step S405.

In step S404, the control unit 101 instructs the wireless communication recording medium 200 to invalidate the communication setting. In response to this instruction, the wireless communication recording medium stops the wireless communication circuit unit 203. The control unit 101 counts time lapsed after this instruction is sent.

In step S405, the control unit 101 executes auto-exposure (AE) and auto-focus (AF).

In step S406, the control unit 101 determines whether the invalidation of the communication setting is completed in the wireless communication recording medium 200. If the wireless communication recording medium 200 invalidates the communication setting in response to the instruction in step S404, it sends back its result to the digital camera 100. More specifically, the control unit 101 can determine whether processing for invalidating the communication setting is completed by verifying this reply. When it is determined that the invalidation processing is completed, the processing proceeds to step S409. Unless it can be determined that the invalidation processing is completed, the processing proceeds to step S407.

If the communication setting is invalidated, wireless communication between the wireless communication recording medium and a communication target is cut out, so that transmission of the image file is canceled.

In step S407, the control unit 101 determines whether a preliminarily set threshold value, M seconds, has passed by referring to a counted time. If it is determined that M seconds have passed, the processing proceeds to step S408 and otherwise, the processing returns to step S406.

In step S408, the control unit 101 determines that an error occurs in the wireless communication recording medium 200 or a transmission path, and an alarm is displayed on the display unit 130 indicating that the digital camera 100 is incapable of controlling the wireless communication recording medium 200.

Figure 7A:
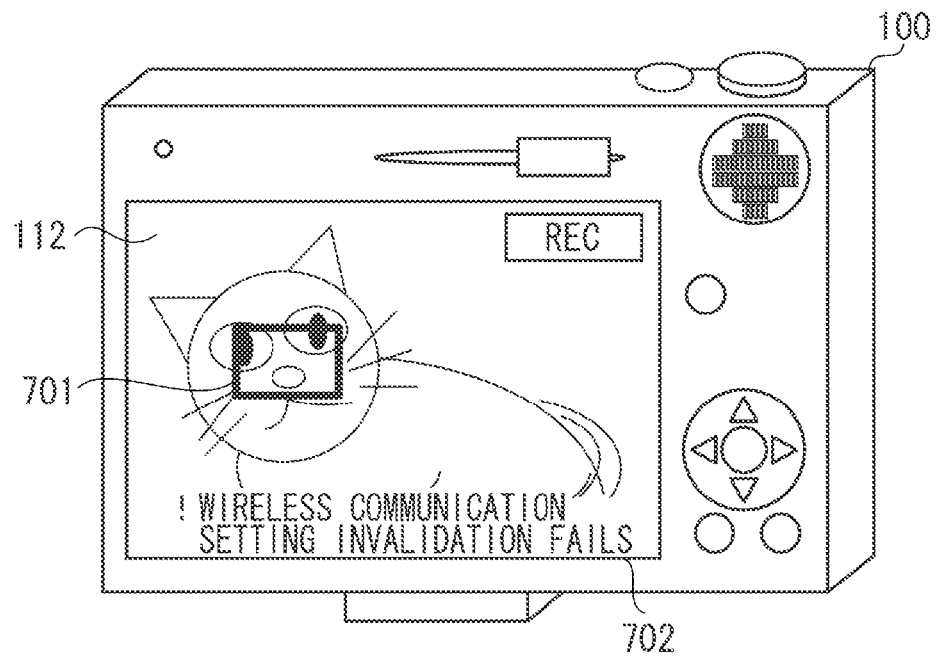
FIGS. 7A and 7B are diagrams illustrating a display screen of the digital camera.

In step S409, the control unit 101 displays a focus frame which indicates a result of the auto-focus executed in step S405. FIG. 7A illustrates an example of the display on the display unit 130. A focus frame 701 is displayed over a through image on the display unit 130 of the digital camera 100. FIG. 7A displays also an alarm message 702 indicated in step S408. If it is normally detected that the invalidation processing for the communication setting is completed in the processing of step S406, no message is displayed. If, in step S401, the release button is pressed straight up to the SW2 state without being pressed in a stepwise fashion in the order of SW1 to SW2, the capturing of the moving image described in step S411 is executed without displaying the focus frame 701 or the alarm message 702.

In step S419, the control unit 101 determines whether the pressing of the release button SW1 of the operation unit 102 is cancelled. If it is determined that the pressing of the release button SW1 is cancelled, the processing returns to step S401 and the control unit 101 stands by again until the release button SW1 is pressed. If it is determined that the pressing of the release button is not released, the processing proceeds to step S410.

In step S410, the control unit 101 determines whether the release button SW2 of the operation unit 102 is pressed. If it is determined that the release button is pressed, the processing proceeds to step S411. Otherwise, the processing returns to step S419. When the release button SW2 is pressed, a series of processing for capturing and recording moving image data is started.

In step S411, the control unit 101 captures a moving image by controlling the image capturing unit 110.

In step S412, the control unit 101 performs processing of recording the captured moving image data successively into the memory 104.

In step S413, the control unit 101 records the moving image data recorded in the memory 104 into the recording medium 141 as a moving image file. At this time, attribute information such as shooting date is added to the moving image file. If the shooting is executed without invalidating the communication setting due to an error in the wireless communication medium 200 or the transmission path, the attribute information indicating occurrence of the error is also added. For example, flags may be used as this attribute information. More specifically, if the communication setting is properly invalid, the control unit 101 writes 0 into a predetermined area of the moving image file as the attribute information and otherwise, writes 1.

Figure 7B:
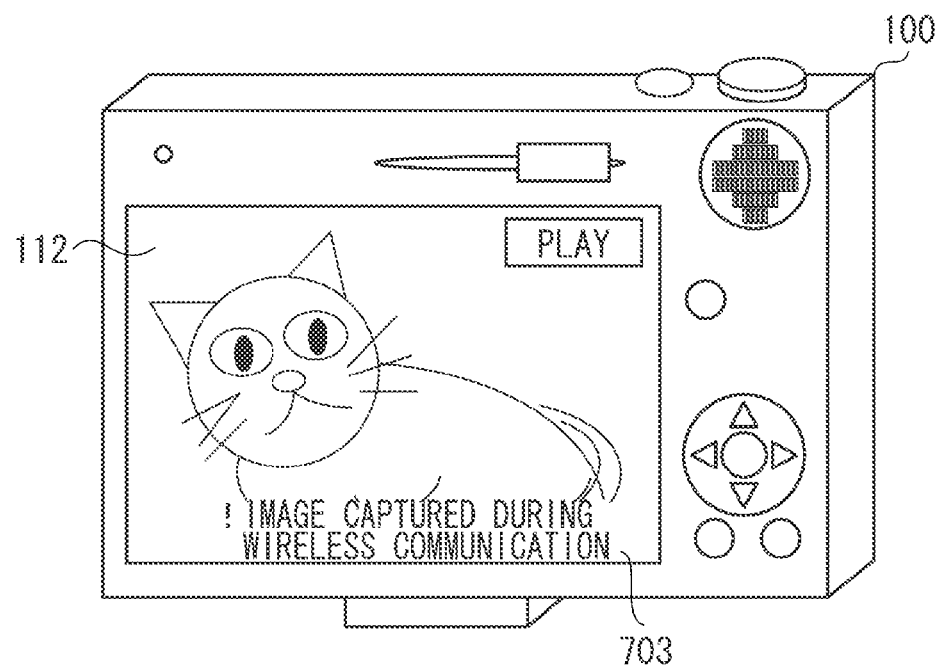

In the meantime, indication that the invalidation of the communication setting is not completed in the shooting is shown when image data is displayed not only in the shooting mode but also in a playback mode. FIG. 7B illustrates an example of this case. In this case, the alarm message 703 is displayed over the image data.

In step S414, the control unit 101 determines whether the release button SW2 of the operation unit 102 is pressed, more specifically, whether an instruction for terminating shooting of a moving image is dispatched. If it is determined that the release button SW2 is pressed, the processing proceeds to step S415. Otherwise, the control unit 101 continues shooting of the moving image in steps S411 to S413 with the release button SW2 pressed.

In step S415, the control unit 101 stops the shooting of the moving image. The control unit 101 stops the shooting of the moving image and finalizes the recorded moving image file.

In step S416, the control unit 101 determines whether the wireless communication recording medium 200 is mounted. If it is determined that the wireless communication recording medium 200 is mounted, the processing proceeds to step S417. Otherwise, the processing proceeds to step S401.

In step S417, the control unit 101 verifies a current communication condition of the wireless communication recording medium 200 and determines whether the communication setting is invalid. If it is determined that the communication setting is invalid, the processing proceeds to step S418. If it is determined that the communication setting is valid, the processing returns to step S401.

In step S418, the control unit 101 validates the communication setting of the wireless communication recording medium 200 and performs control to restart transmission of data from the wireless communication recording medium 200.

An operation of the normal moving image mode has been described above. As stated above, when the normal moving image mode is selected, the digital camera 100 invalidates the communication setting when the release button SW1 is pressed to start preparation for shooting. When the release button SW2 is pressed to stop shooting of the moving image and recording of the moving image file into the wireless communication recording medium 200 is completed, the control unit 101 brings back the communication setting to valid. As a result, the wireless communication circuit unit 203 in the wireless communication recording medium 200 is stopped during shooting and recording of the moving image. Accordingly, noise caused by radio wave is prevented from mixing into captured and recorded moving image data. Further, after the normal moving image mode is selected, the communication setting is kept valid until the preparation for shooting is started by pressing the release button SW1. Consequently, a time when the wireless communication recording medium 200 can transmit data is increased so that the wireless communication recording medium becomes capable of transmitting a larger amount of the image data. Although, in the exemplary embodiment, the wireless communication circuit unit 203 is stopped when the release button SW1 is pressed, the wireless communication circuit unit 203 may be stopped when the release button SW2 is pressed if the processing executed until the wireless communication circuit unit 203 is stopped is sufficiently quick.

Next, processing at still image mode will be described. Basically, the still image mode executes the same processing as the normal moving image mode. More specifically, the control unit 101 invalidates the communication setting of the wireless communication recording medium in response to the SW1 being pressed. Then, when still image data is captured by pressing the SW2, the control unit 101 monitors recording of its still image file into the wireless communication recording medium 200. After determining that the recording of the still image file into the wireless communication recording medium is completed, the control unit 101 validates the communication setting of the wireless communication recording medium 200. Consequently, the wireless communication circuit unit 203 in the wireless communication recording medium 200 can be stopped during shooting of the moving image like the normal moving image mode.

Figure 5A:
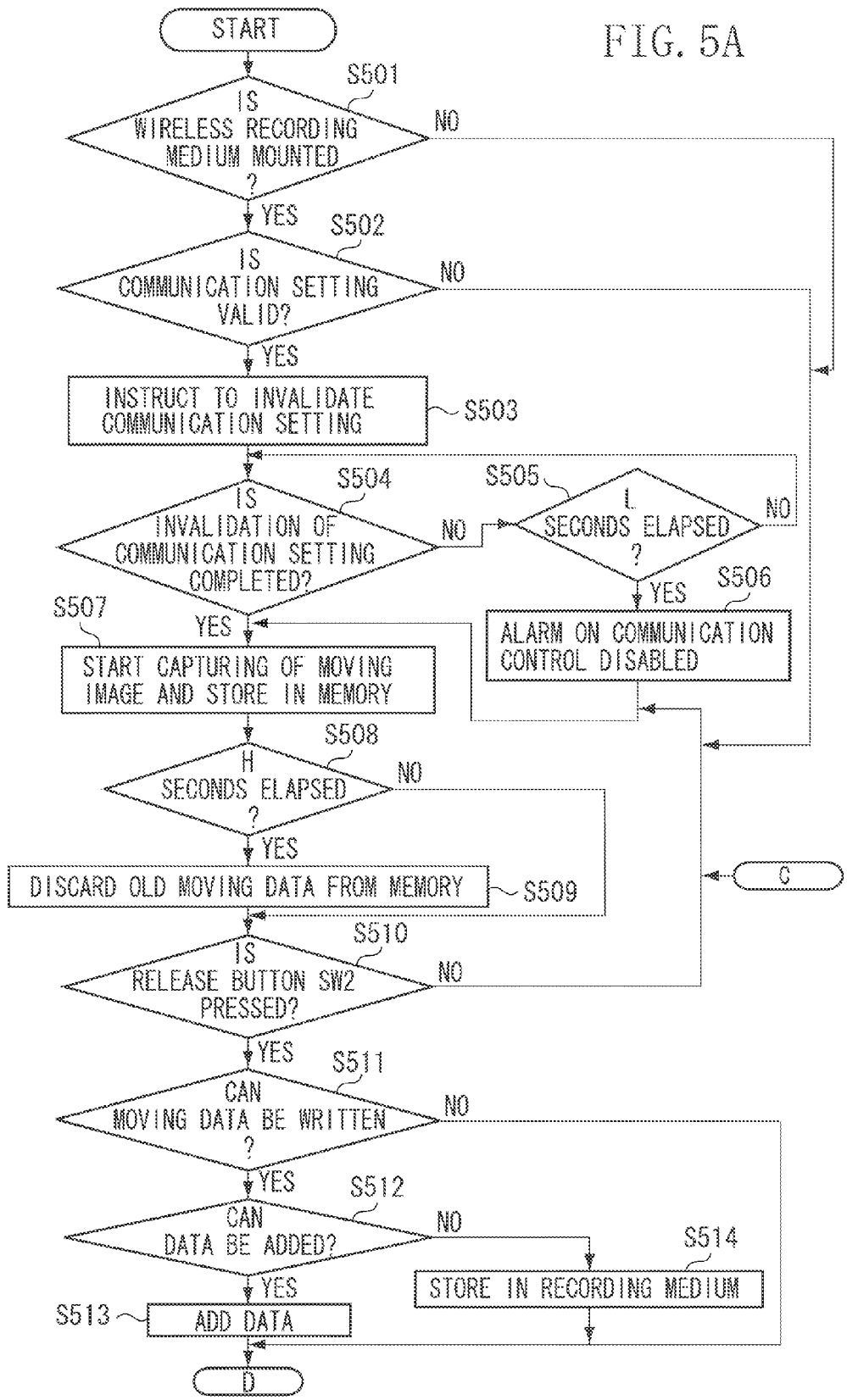
FIG. 5A is a flow chart illustrating the processing procedure of the digital camera.
Figure 5B:
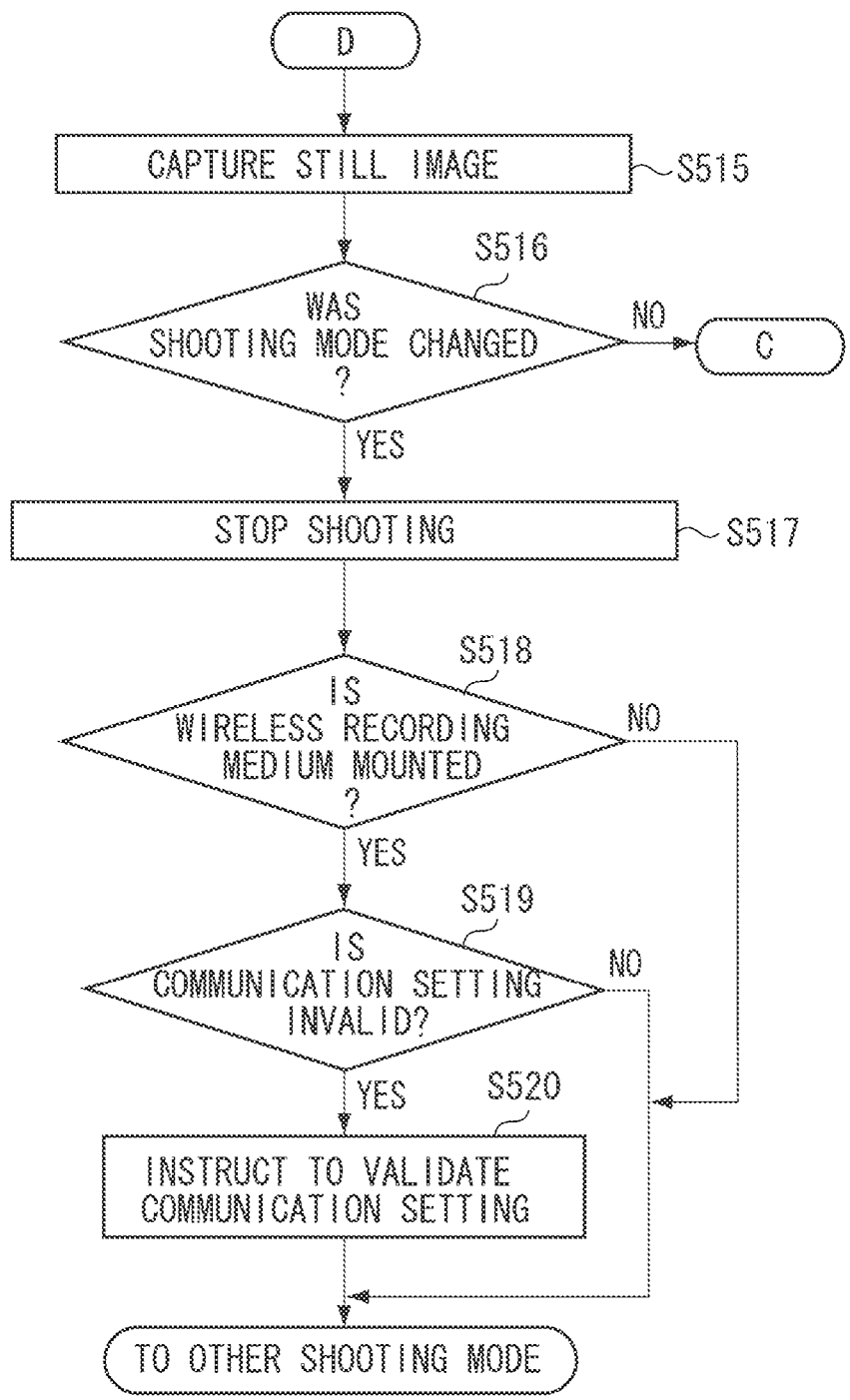
FIG. 5B is a flow chart illustrating the processing procedure of the digital camera.

Next, processing at the movie digest mode, which is an example of the second shooting mode, will be described with reference to FIGS. 5A, 5B. First, in step S501, the control unit 101 determines whether the wireless communication recording medium is mounted on the digital camera 100. When it is determined that the wireless communication recording medium 200 is mounted, the processing proceeds to step S502. If it is determined that no wireless communication recording medium 200 is mounted, the processing proceeds to step S507.

In step S502, the control unit 101 verifies a current communication setting of the wireless communication recording medium 200 and determines whether the communication setting is valid. If the communication setting is valid, the processing proceeds to step S503. If the communication setting is invalid, the processing proceeds to step S507. In step S503, the control unit 101 instructs the wireless communication recording medium to invalidate the communication setting. In response to this instruction, the wireless communication recording medium 200 stops the wireless communication circuit unit 203. The control unit 101 counts a time which passes after this instruction is transmitted.

In step S504, the control unit 101 determines whether the invalidation processing of the communication setting in the wireless communication recording medium 200 is completed. If it is determined that the invalidation processing is completed, the processing proceeds to step S507. If it is determined that the invalidation processing of the communication setting is not completed, the processing proceeds to step S505.

In step S505, the control unit 101 determines whether a preliminarily set threshold value L seconds have passed by referring to a counted time. If it is determined that L seconds have passed, the processing proceeds to step S506, and otherwise, the processing returns to step S504. In step S506, the control unit 101 displays an alarm indicating that the wireless communication recording medium 200 cannot be controlled from the digital camera 100 like in step S408 of FIG. 4A, on the display unit 130.

In step S507, the control unit 101 starts shooting the moving image data and records the captured moving image data successively in the memory 104. To start the shooting in step S507, no operation of the release button like the processing in FIGS. 4A, 4B is necessary. More specifically, once a user performs an operation of selecting the movie digest mode as a shooting mode, shooting and recording (shooting M1, M2, . . . in FIG. 6A) are automatically started.

In step S508, the control unit 191 determines whether a moving image having a predetermined length of time H, in the exemplary embodiment, 4 seconds or more, is recorded into the memory 104. If it is determined that a moving image having a length of time 4 seconds or more is recorded, the processing proceeds to step S509, and if it is determined that a moving image having a length of time less than 4 seconds is recorded, the processing proceeds to step S510. The predetermined length of time H is decided preliminarily and its value is set so that the size of a moving image data captured within the predetermined length of time H does not exceed the capacity of the memory 104.

In step S509, the control unit 101 discards moving image data currently recorded in the memory 104 in order from older recording date, while it records new moving image data. More specifically, when the moving image data having a length of time 4 seconds is accumulated in the memory 104, the control unit 101 discards it and when the moving data having a length of time 4 seconds is accumulated again, the control unit 101 repeatedly discards it. That is, according to this embodiment, the newest moving image data having a length of time 4 seconds at largest is always accumulated in the memory 104.

In step S510, the control unit 101 determines whether the release button SW2 of the operation unit 102 is pressed. In the exemplary embodiment, pressing of the release button SW2 in the movie digest mode indicates instruction for shooting a still image. When it is determined that the release button SW2 is pressed, the processing proceeds to step S511. If it is determined that the release button is not pressed, the processing proceeds to step S507, in which the shooting of the moving image is continued. Pressing of the release button SW2 corresponds to Release 1, 2, 3 in FIG. 6.

In step S511, the control unit 101 determines whether the moving image data recorded in the memory 104 in step S507 can be written into the recording medium 141. More specifically, the control unit 101 makes a determination by comparing the size of the moving image data recorded in the memory 104 with a free capacity of the recording medium 141 minus an estimated capacity of a still image to be captured in step S515. In the meantime, if the length of time of the moving image data stored in the memory 104 is below a predetermined number of seconds (e.g., data having a length of time only less than 1 second is stored in the memory 104), the control unit 1 may determine that the recording medium 141 is not writable. When the control unit 101 determines that the recording medium 141 is writable, the processing proceeds to step S512, and if the control unit 101 determines that it is not writable, the processing proceeds to step S514.

In step S512, the control unit 101 determines whether the moving image data recorded in the memory 104 can be added to the digest moving image recorded in the recording medium 141. Unless the digest moving image is recorded in the recording medium 141, the processing proceeds to step S514. Whether the moving image data can be added to the digest moving image is determined on following criteria.

- A moving image file which is an addition target has a protected attribute
- The file size after another moving image was added is over the data size which is an upper limit of the file system in the recording medium 141
- The moving image file which is the addition target is not constructed in the unit of group of pictures (GOP)
- The shooting date information of the moving image file which is the addition target is different from a current date
- Regional setting information of the addition target moving image file is different from a region set currently in the digital camera 100
- Information about the type of a camera which shot an image stored in the addition target moving image file is different from the camera type of the current digital camera 100
- The moving image file which is the addition target is different from the moving image data recorded in the memory 104 in terms of any of frame rate, number of pixels, compression method, sound sampling rate, number of channels and bit depth.
- It is determined that data has been destroyed Unless a given case falls under any of the above-mentioned cases, the control unit 101 determines that the moving image data can be added. If the given case falls under any of the above-mentioned cases, the control unit 101 determines that the moving image data cannot be added. If it is determined that the moving image data can be added, the processing proceeds to step S513, and if it is determined that the moving image data cannot be added, the processing proceeds to step S514.

In step S513, the control unit 101 adds the moving image data recorded in the memory 104 to the digest moving image recorded in the recording medium 141 and the processing proceeds to step S515. This processing corresponds to processing of adding the M5 and M9 to M3 in FIG. 6.

In step S514, the control unit 101 stores the moving image data recorded in the memory 104 into the recording medium 141 as a new independent digest moving image and the processing proceeds to step S515.

In step S515, the control unit 101 captures a still image.

In step S516, the control unit 101 determines whether the shooting mode is changed from the movie digest mode to other shooting mode. If it is determined that the shooting mode is changed to other shooting mode, the processing proceeds to step S517. Otherwise, the processing returns to step S507 and the control unit 101 continues capturing of the moving image.

In step S517, the control unit 101 stops capturing of the moving image and the processing proceeds to step S518.

In step S518, the control unit 101 determines whether the wireless communication recording medium 200 is mounted on the digital camera 100. If it is determined that the wireless communication recording medium 200 is mounted, the processing proceeds to step S519. Otherwise, the digital camera is activated at the changed shooting mode.

In step S519, the control unit 101 determines whether the communication setting of the mounted wireless communication recording medium 200 is invalid. If the communication setting is invalid, the processing proceeds to step S520. If the communication setting is valid, the digital camera is activated at the changed shooting mode.

In step S520, the control unit 101 instructs the wireless communication recording medium 200 to validate the communication setting. After accepting the instruction, the wireless communication recording medium 200 validates the communication. Consequently, the data transmission is restarted.

As described above, in the movie digest mode, the communication setting of the wireless recording medium 200 is invalidated by the control unit 101. Thus, in this period, the control unit 101 does not display or grays out items concerning the communication setting in the menu, so that the user cannot change the communication setting.

The operation of the movie digest mode has been described above. As described above, when the digital camera 100 is changed to the movie digest mode, it invalidates the communication setting of the wireless communication recording medium. This point is completely different from the normal moving image mode and the still image mode which invalidate the communication setting when the release button SW2 is pressed.

The reason why the movie digest mode causes the above-described operation is as follows. The movie digest mode allows the moving image to be recorded regardless of whether the release button is pressed and the moving image is recorded in the wireless communication recording medium 200 as a moving image file. Referring to FIG. 6, the M3, M5, M9 are such moving image files. In such movie digest mode, even if the communication setting is invalidated by pressing the release button SW2 (at timings of release 1 to 3 in FIG. 6), noise cannot be prevented from mixing into the M3, M5, M9. The reason for that is that the communication setting is not invalidated at the timings of capturing the M3, M5, and M9. Thus, according to the exemplary embodiment, in order to prevent noise from mixing into moving image data captured before the release button is pressed, the communication setting for the wireless communication recording medium is invalidated in response to shifting to the movie digest mode.

As described above, in the digital camera 100 of the exemplary embodiment, the timing for invalidating the communication setting is different depending on the shooting mode. This leads to securing a transmission period appropriately depending on the characteristic of each shooting mode and preventing mixture of noise.

Other Embodiments

Although the exemplary embodiment employs the still image mode, the normal moving image mode and the movie digest mode, the present invention is not restricted to these shooting modes. For example, it is possible to provide a mode in which when selected, the digital camera continues to capture a moving image even without any operation of the release button and after shooting, a user may cut out an arbitrary section from the captured moving image by specifying it. In this case also, any captured moving image data can be recorded in the recording medium 141 as a moving image file. Therefore, even if such a mode is provided, it is preferable to invalidate the communication setting in response to changing of the mode like the movie digest mode of the first exemplary embodiment.

While, in the first exemplary embodiment, the wireless communication circuit unit 203 of the wireless communication recording medium has been described as a radio wave generation source, the wireless communication circuit unit, which is an example of the communication device, may be accommodated in the digital camera. In this case also, the same control as described in the first exemplary embodiment is performed on the accommodated wireless communication circuit unit. In this case, the recording medium 141 may be accommodated in the digital camera 100.

According to the exemplary embodiment, the communication setting is brought back to the valid state after a file is recorded in the wireless communication recording medium 200. However, depending on the specification of the digital camera 100, the digital camera can be affected considerably by noise during data transmission from the image capturing unit 110 to the memory 104, and can be affected less by noise during data transmission to the wireless communication recording medium 200. Therefore, it is possible to render the communication setting invalid until data is recorded in the memory 104 and bring back the communication setting to the valid state in recording the data into the wireless communication recording medium 200.

Further, the present invention can be applied to such a system in which the digital camera 100 is remotely controlled from a personal computer (PC). In this case, the control unit of the PC makes various inquires and requests of control to the control unit 101 of the digital camera 100 to execute the processing illustrated in FIGS. 4 and 5 under the remote control from the PC.

Additionally, the present invention is achieved by executing following processing. Software (program) for achieving the function of the above-described embodiment is supplied to the system or the apparatus via network or various storage medium, and then, a computer (CPU or MPU) in the system or the apparatus reads out the program and executes the read program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-022861 filed Feb. 4, 2011, which is hereby incorporated by reference herein in its entirety.

What is claimed is:

1. An image capturing apparatus capable of controlling a communication device configured to transmit image data to an external apparatus, the image capturing apparatus comprising:
    a shooting mode setting unit configured to set a shooting mode, wherein the shooting mode includes a first shooting mode and a second shooting mode;
    an image capturing unit configured to shoot an object based on the shooting mode to obtain image data;
    a recording unit configured to record the image data obtained by the image capturing unit in a recording medium;
    an operation unit configured to accept a shooting preparation instruction or a shooting instruction from a user; and
    a control unit configured to control a communication function of the communication device,
    wherein, the image capturing unit starts shooting of an image in response to an operation of the operation unit in the first shooting mode,
    wherein, the image capturing unit starts shooting of an image without accepting the shooting preparation instruction or the shooting instruction through the operation unit in the second shooting mode,
    wherein, in a case that the first shooting mode is set by the shooting mode setting unit, the control unit performs control to invalidate the communication function of the communication device in response to accepting the shooting preparation instruction or the shooting instruction through the operation unit, and
    wherein, in a case that the second shooting mode is set by the shooting mode setting unit, the control unit performs control to invalidate the communication function of the communication device in response to shifting to the second shooting mode.

2. The image capturing apparatus according to claim 1, wherein, after the communication function of the communication device is invalidated by the control unit, in a case that image data obtained by the image capturing unit is recorded in a recording medium, the control unit performs control to validate the communication function of the communication device.

3. The image capturing apparatus according to claim 1, wherein the operation unit is a release button, and wherein the first shooting mode accepts the shooting preparation instruction or the shooting instruction in a case that the release button is pressed.

4. The image capturing apparatus according to claim 1, wherein the communication device is located in a housing of the recording medium.

5. The image capturing apparatus according to claim 4, wherein the recording medium is detachable to the image capturing apparatus.

6. The image capturing apparatus according to claim 1, wherein the image capturing unit automatically starts shooting a moving image in response to shifting to the second shooting mode by the shooting mode setting unit.

7. The image capturing apparatus according to claim 6, wherein, in a case that the shooting preparation instruction or the shooting instruction is accepted by the operation unit in the second shooting mode, the recording unit records, in the recording medium, a moving image data having a predetermined length of time by selecting from among the moving image data obtained by the automatically-started shooting.

8. The image capturing apparatus according to claim 7, wherein the moving image data having a predetermined length of time is moving image data which is captured prior to the shooting preparation instruction or the shooting instruction.

9. The image capturing apparatus according to claim 8, wherein a period of the moving image data having a predetermined length of time is determined on the basis of the shooting preparation instruction or the shooting instruction.

10. The image capturing apparatus according to claim 6, wherein the shooting preparation instruction is a still image shooting preparation instruction and the shooting instruction is a still image shooting instruction.

11. The image capturing apparatus according to claim 10, wherein in a case where the still image shooting instruction is received under the second shooting mode, the recording unit records still image data obtained according to the still image shooting instruction and at least a part of the moving image data obtained by the automatically-started shooting on the recording medium.

12. The image capturing apparatus according to claim 1, further comprising a display unit configured to display a menu for setting the communication function based on a user's operation,
wherein, in the second shooting mode, the display unit displays the menu in such a manner that the communication function cannot be validated.

13. The image capturing apparatus according to claim 1, wherein a plurality of moving image data captured under the first shooting mode are recorded as a plurality of moving image files respectively corresponding to each of the capturing, and
wherein at least a part of images from among a plurality of moving image data which are automatically captured under the second shooting mode are recorded as one moving image file.

14. A control method for an image capturing apparatus capable of controlling a communication device configured to transmit image data to an external apparatus, the control method comprising:
setting a shooting mode, wherein the shooting mode includes a first shooting mode and a second shooting mode;
shooting an object based on the shooting mode to obtain image data;
recording the image data obtained by the shooting in a recording medium;
accepting a shooting preparation instruction or a shooting instruction from a user,
wherein, shooting of an image starts in response to accepting the shooting preparation instruction or a shooting instruction in the first shooting mode,
wherein, shooting of an image starts without accepting the shooting preparation instruction or the shooting instruction in the second shooting mode,
wherein in a case that the first shooting mode is set, performing control to invalidate the communication function of the communication device in response to accepting the shooting preparation instruction or the shooting instruction; and
wherein in a case that the second shooting mode is set, performing control to invalidate the communication function of the communication device in response to shifting to the second shooting mode.

15. A non-transitory computer-readable recording medium configured to record a program which causes a computer to execute the control method of claim 14.

* * * * *